United States Patent [19]

Takanashi et al.

[11] Patent Number: 4,746,972
[45] Date of Patent: May 24, 1988

[54] IMAGING APPARATUS WITH BIDIRECTIONALLY TRANSFERRABLE IDENTICAL CHARGE TRANSFER DEVICES FOR CONVERTING MIRROR IMAGES

[75] Inventors: Itsuo Takanashi, Yokohama; Shintaro Nakagaki; Hiroshi Nishiyama, both of Kanagawa, all of Japan

[73] Assignee: Victor Company of Japan, Ltd., Yokohama, Japan

[21] Appl. No.: 626,043

[22] Filed: Jun. 29, 1984

[30] Foreign Application Priority Data

Jul. 1, 1983 [JP] Japan .................................. 58-119774
Jul. 6, 1983 [JP] Japan .................................. 58-122862
Jul. 8, 1983 [JP] Japan .................................. 58-124436

[51] Int. Cl.⁴ .......................... H04N 9/09; H04N 3/15; H04N 5/335; H04N 9/097
[52] U.S. Cl. ......................................... 358/43; 358/55; 358/213.25; 358/213.26; 357/24
[58] Field of Search ................ 358/41, 43, 44, 48, 358/50, 52, 55, 213; 357/24 LR

[56] References Cited

U.S. PATENT DOCUMENTS

| | | | |
|---|---|---|---|
| 3,603,273 | 9/1971 | Tan | 358/55 |
| 3,777,061 | 12/1973 | Takemura | 258/44 |
| 3,934,266 | 1/1976 | Shinozaki et al. | 358/41 |
| 4,280,141 | 7/1981 | McCann et al. | 358/213.26 |
| 4,349,743 | 9/1982 | Ohba et al. | 358/48 |
| 4,369,459 | 1/1983 | Iwawasa et al. | 358/50 |
| 4,551,760 | 11/1985 | Bendell | 358/213 |

FOREIGN PATENT DOCUMENTS

| | | | |
|---|---|---|---|
| 52-4735 | 1/1977 | Japan | 358/213 |
| 54-56722 | 5/1979 | Japan | 358/43 |
| 54-127621 | 10/1979 | Japan | 358/213 |
| 58-195371 | 11/1983 | Japan | 358/213.29 |
| 59-19493 | 1/1984 | Japan | 358/44 |
| 59-25483 | 2/1984 | Japan | 358/213 |
| 82031146 | 9/1982 | PCT Int'l Appl. | 358/213 |

Primary Examiner—James J. Groody
Assistant Examiner—Randall S. Svihla
Attorney, Agent, or Firm—Cushman, Darby & Cushman

[57] ABSTRACT

An incident optical image is split by a single semi-transparent mirror into first and second optical images and directed onto first and second intersecting planes so that the images are in mirror-image relationship to each other with respect to a line of intersection between the two planes. First and second identical solid-state area imagers are located on the two planes, respectively. A pair of identical solid-state area imagers respectively include image sensors for generating charges corresponding to the optical images incident thereon. A vertically bidirectionally transferrable charge transfer device is coupled to each image sensor and a horizontally bidirectionally transferrable charge transfer device is coupled to the vertical transfer device. The vertical and horizontal charge transfer devices of both imagers are driven so that signals derived therefrom will produce identical electronic images.

3 Claims, 8 Drawing Sheets

IMAGING APPARATUS WITH BIDIRECTIONALLY TRANSFERRABLE IDENTICAL CHARGE TRANSFER DEVICES FOR CONVERTING MIRROR IMAGES

BACKGROUND OF THE INVENTION

The present invention relates to a solid-state image pickup apparatus.

Conventional color image pickup apparatus such as television cameras comprises a plurality of dichroic color separation mirror prisms. These prisms are arranged so that the separated color images undergo no reflection or two reflections so that they coincide in orientation and that the separated images travel equal path lengths to associated solid-state area imagers. One shortcoming of the prior art is that the use of dichroic mirror prisms results in an expensive camera. A further shortcoming is that a long-focus viewing lens must be employed with the dichroic prisms which results in a heavy and bulky camera.

SUMMARY OF THE INVENTION

Therefore, an object of the present invention is to eliminate the prior art shortcomings.

In accordance with the present invention, an incident optical image is split by a single semi-transparent mirror into first and second optical images and directed onto first and second intersecting planes repectively so that the images are in mirror-image relationship to each other with respect to a line where the two planes intersect. First and second identical solid-state area imagers are located on the first and second planes to receive the first and second optical images respectively. The area imagers respectively include image sensors to generate electrostic charges corresponding to the first and second optical images incident thereon. A vertically bidirectionally transferrable charge transfer device is coupled to the image sensor of each area imager and a horizontally bidirectionally transferrable charge transfer device is coupled to the vertical transfer device. The vertical and horizontal charge transfer devices of both imagers are driven in such directions that signals derived from the horizontal transfer devices will produce identical electronic images.

The present invention thus eliminates the need for employing dichroic mirrors for color separation purposes which are required to provide at least two reflection paths for making separated images coincide with each other.

BRIEF DESCRIPTION OF THE DRAWINGS

The present invention will be described in further detail with reference to the accompanying drawings, in which.

DETAILED DESCRIPTION

Figure 1:
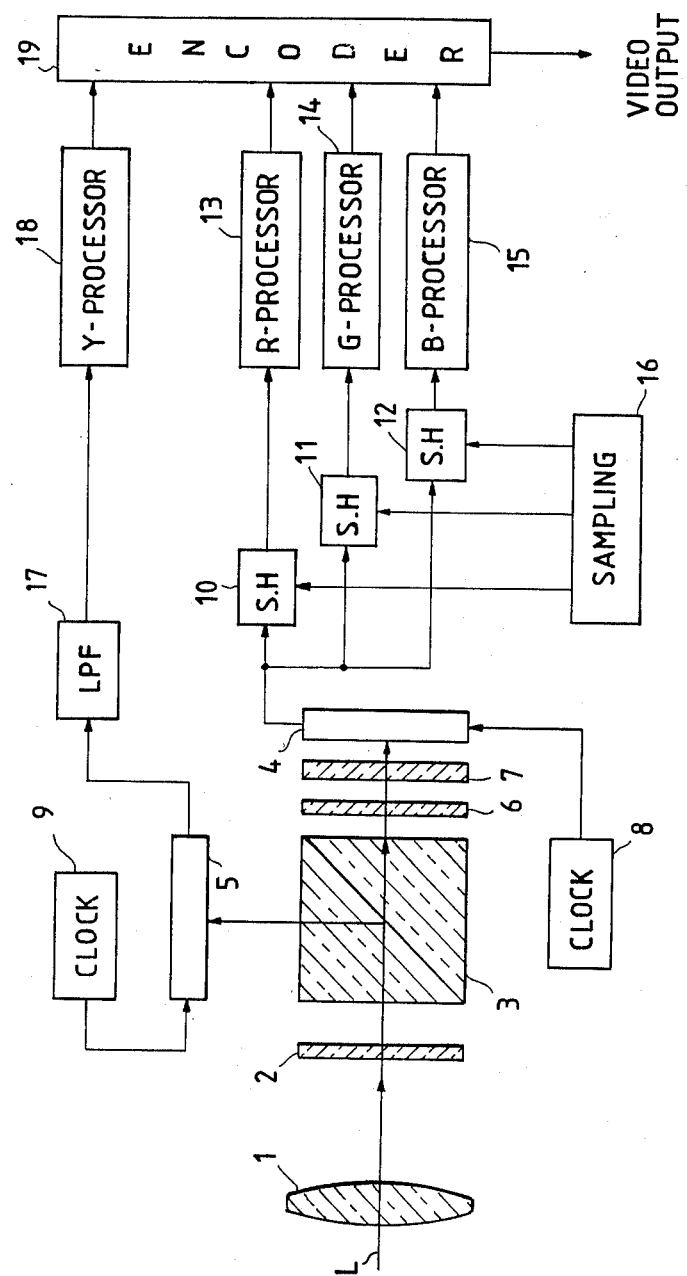
FIG. 1 is a schematic illustration of an image pickup apparatus of the invention with an optical arrangement as viewed from above.

Referring to FIG. 1, there is shown a solid-state color image pickup apparatus of the present invention. The apparatus includes a viewing lens 1 that directs incident light L through an infrared rejection filter 2 to a semi-transparent mirror prism 3 which splits the incident light into first and second optical images of like wavelength components by passing portion of the light to a first solid-state area imager 4 and reflecting the remainder to a second solid-state area imager 5. Imagers 4 and 5 are located so that the optical path lengths are equal to each other. To derive a color television signal, an optical low-pass filter 6 and a color stripe filter 7 are provided between prism 3 and imager 4. Color stripe filter 7 has a recurrent pattern of successively arranged stripes of red, green and blue colors. The purpose of optical low-pass filter 6 is to cut off optical high frequency components which might otherwise result in false color information as the light undergoes color separation.

Imagers 4 and 5 are driven by clock sources 8 and 9, respectively. As will be detailed later, each imager is driven by a set of sequentially locked pulses that cause charges to move in a vertical direction and by another set of sequentially clocked pulses that drives the charges in a horizontal direction.

The output of first imager 4 is fed to a color processing circuit including sample-and-hold circuits 10, 11 and 12 and red-, green- and blue-processors 13, 14 and 15 connected to sample-and-holds 10, 11 and 12, respectively. The red, green and blue signals for imager 4 are sampled sequentially by sample-and-holds 10, 11 and 12 in response to sampling pulses which are supplied at a rate three times higher than the horizontal clock rate of the imagers from a sampling pulse generator 16 and applied to red-, green- and blue-processors 13, 14, 15. Each of these processors performs blanking, gamma correction and white balance operations in a manner known in the art.

The output of imager 5 is coupled through a low-pass filter 17 to a luminance or Y signal processor 18 having similar functions to the color processors 13–15.

The output signals from processors 13–15 and 18 are presented to a known encoder 19 which performs generation of color difference signals, modulation of the color difference signals upon a subcarrier, insertion of sync signals to the luminance signal and mixing of the luminance and chrominance signals.

It is assumed that the reflecting plane of prism 3 is vertically oriented. The images focused on imagers 4 and 5 are therefore in reverse orientation to each other with respect to the vertical. According to the invention, images reconstructed by the luminance and chrominance signals are made to be coincident in orientation with each other by driving the imagers 4 and 5 in opposite horizontal directions to each other. FIGS. 2 to 10 are illustrations of various methods whereby the imagers are clocked.

Figure 2:
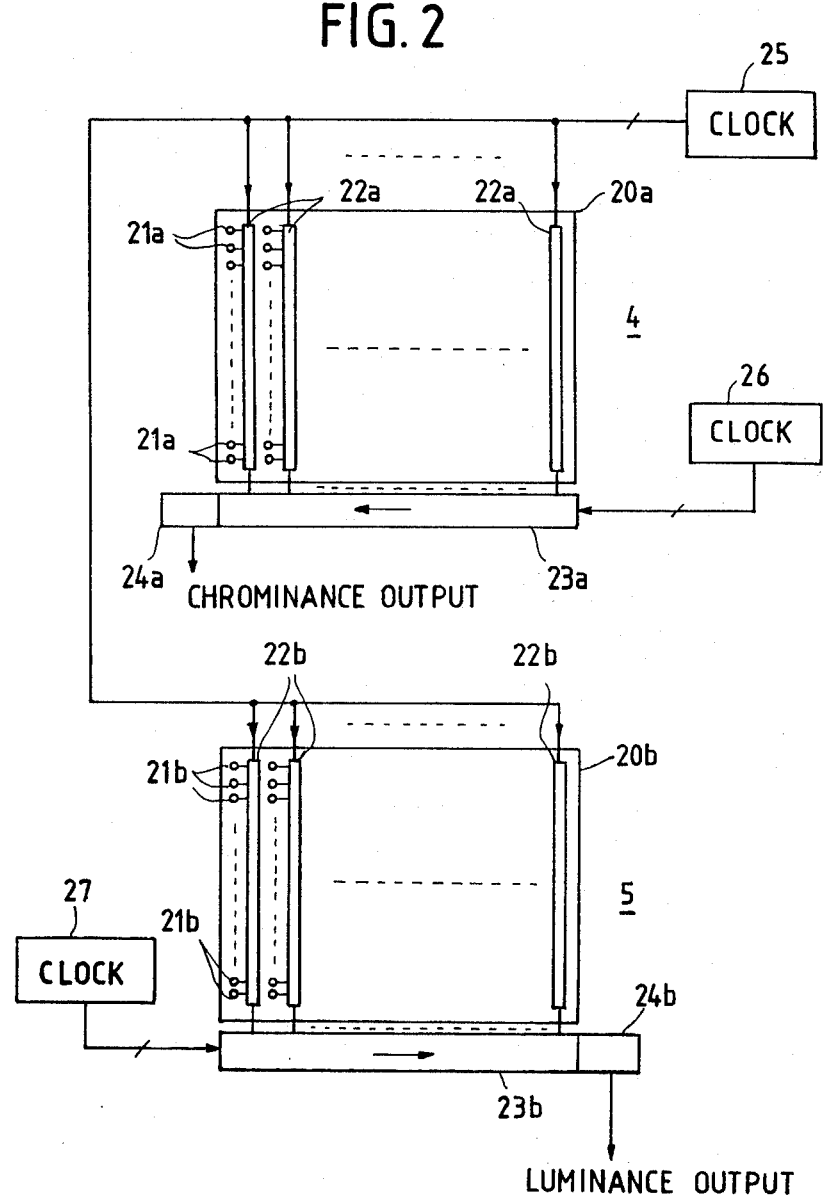
FIG. 2 is an illustration of imagers of interline transfer mode.

FIG. 2 is an illustration of area imagers 4 and 5 on which light is made to be incident in a direction as viewed from above the sheet. Imagers 4 and 5 are charge transfer devices and fabricated in an interline transfer mode. Each imager comprises an image sensor 20 and a horizontal scan charge-coupled device 23. Image sensor 20 comprises a plurality of vertical arrays of photodiodes 21 and a plurality of vertical scan charge-coupled devices 22 successively arranged in side-by-side relationship with the photodiode arrays. Minority-carrier charge packets generated in photodiode arrays 21 of each imager are transferred from one position to the next through the associated vertical scan charged-coupled devices 22 in response to dual-phase sequentially clocked voltage pulses supplied from a common clock source 25 to the horizontal scan charge-coupled device 23.

According to the invention, imager 4 includes a readout circuit 24a which is connected to the leftmost end of horizontal scan charge-coupled device 23a and the latter is driven by dual-phase sequentially clocked voltage pulses supplied from a clock source 26 so that it transfers the charge packets in the leftward direction to the readout circuit 24a. On the other hand, the horizontal scan charge-coupled device 23b of imager 5 is driven by dual-phase sequentially clocked voltage pulses supplied from a clock source 27 to transfer the charge packets in the rightward direction to a readout circuit 24b connected to the rightmost end of charge-coupled device 23b.

With the charge packets being transferred in opposite horizontal directions, images reconstructed by the chrominance and luminance outputs from the readout circuits 24a and 24b are coincident with each other.

Figure 3:
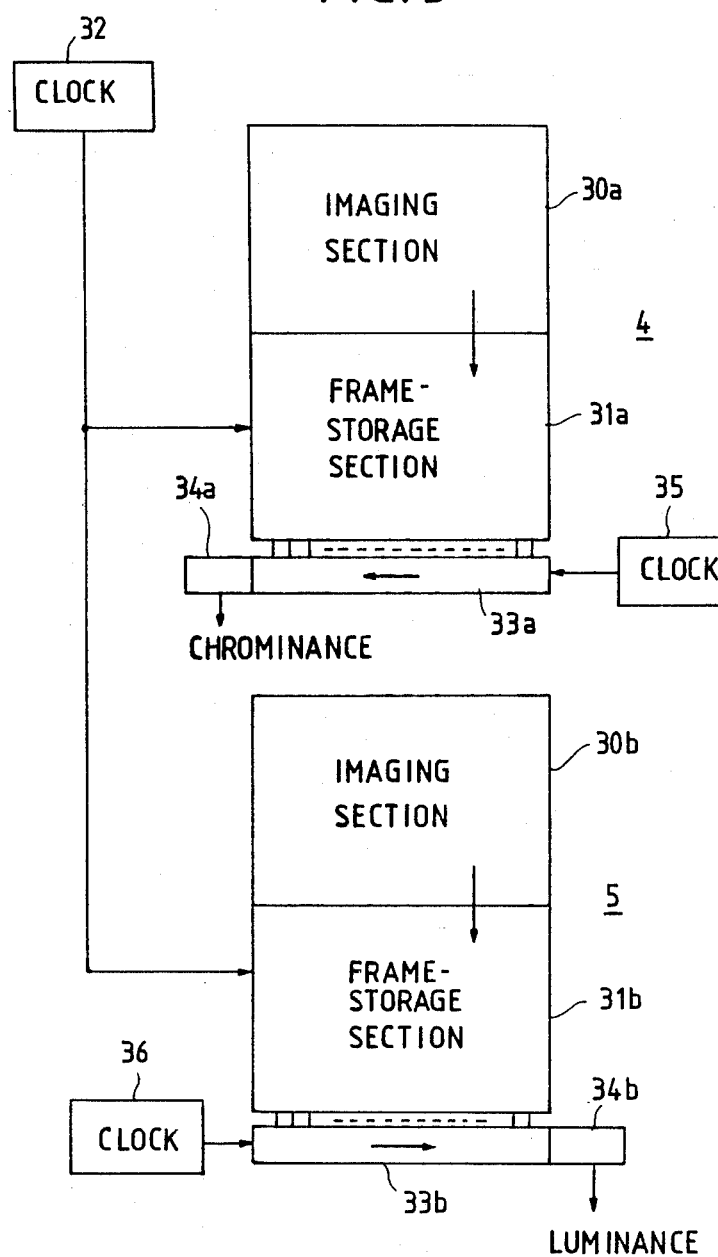
FIG. 3 is an illustration of imagers of frame-storage mode.

In FIG. 3, imagers 4 and 5 are fabricated in a frame-storage mode. Each imager comprises an imaging section 30 and a frame storage section 31. Light is incident on these imaging sections in the same direction as in FIG. 2. Charge is integrated in the imaging sections and then rapidly moved into the frame-storage sections for subsequent readout through a horizontal scan charge-coupled device 33. Frame-storage sections 31 of each imager are driven by dual-phase sequentially clocked voltage pulses supplied from a common clock source 32. A readout circuit 34a is connected to the leftmost end of horizontal-scan charge-coupled device 33a. The latter is driven by dual-phase clock supplied from a clock source 35 to transfer charges in the leftward direction to readout circuit 34a. Readout circuit 34b is connected to the rightmost end of horizontal-scan charge-coupled device 33b of imager 5. CCD 33b is driven by dual-phase clock from a source 36 to move charges in the rightward direction to readout circuit 34b. As in the previous embodiment, reconstructed color and luminance images are coincident with each other.

Figure 4:
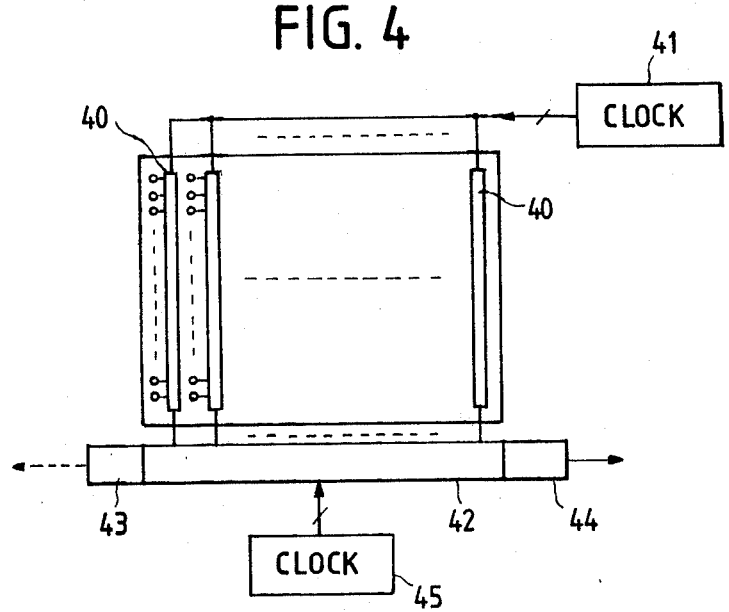
FIGS. 4 and 5 are illustrations of modifications of the embodiments of FIGS. 2 and 3, respectively.
Figure 5:
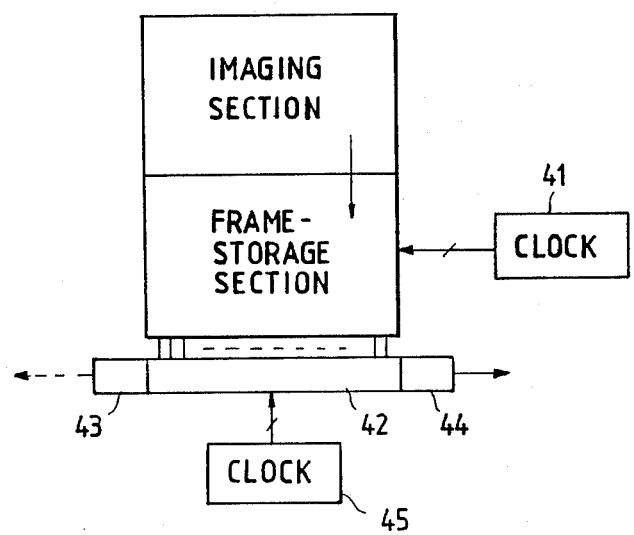

Area imagers shown in FIGS. 4 and 5 are provided with a single horizontal scan charge-coupled device as in the previous embodiments, but differ therefrom in that they each include two readout circuits provided one on each end of the horizontal scan CCD. In FIG. 4, each of the charge transfer imagers (only one is shown) is fabricated in the interline transfer mode as in FIG. 2. The vertical scan charge-coupled devices 40 of both imagers are driven by a common clock source 41 to transfer charge packets down to horizontal scan CCD 42. Readout circuits 43 and 44 are connected to the leftmost and rightmost ends of CCD 42, respectively. CCD 42 of each imager is driven by triple-phase sequentially clocked voltage pulses supplied from an associated reversible clock source 45.

The provision of two readout circuits is advantageous from the manufacture and inventory standpoints since it enables uniformity in manufacture and inventory control. In this embodiment, chrominance output is derived from readout circuit 43 by driving CCD 42 in the leftward direction in the arrangement of FIG. 1. By simply varying the triple-phase relationship, the direction of transfer can be reversed so that the imager can be used to derive a luminance output from readout circuit 44 in the FIG. 1 arrangement. The imager of FIG. 5 operates in a similar fashion to that of the FIG. 4 embodiment with the exception that the image sensor operates in a frame-storage mode.

Depending on different applications, the reflecting surface of semi-transparent mirror prism 3 may have a different orientation from that shown in FIG. 1. It is desirable that the area imager be versatile and can be used in any orientation of prism 3. This is accomplished by embodiments shown in FIGS. 6 to 8.

Figure 6:
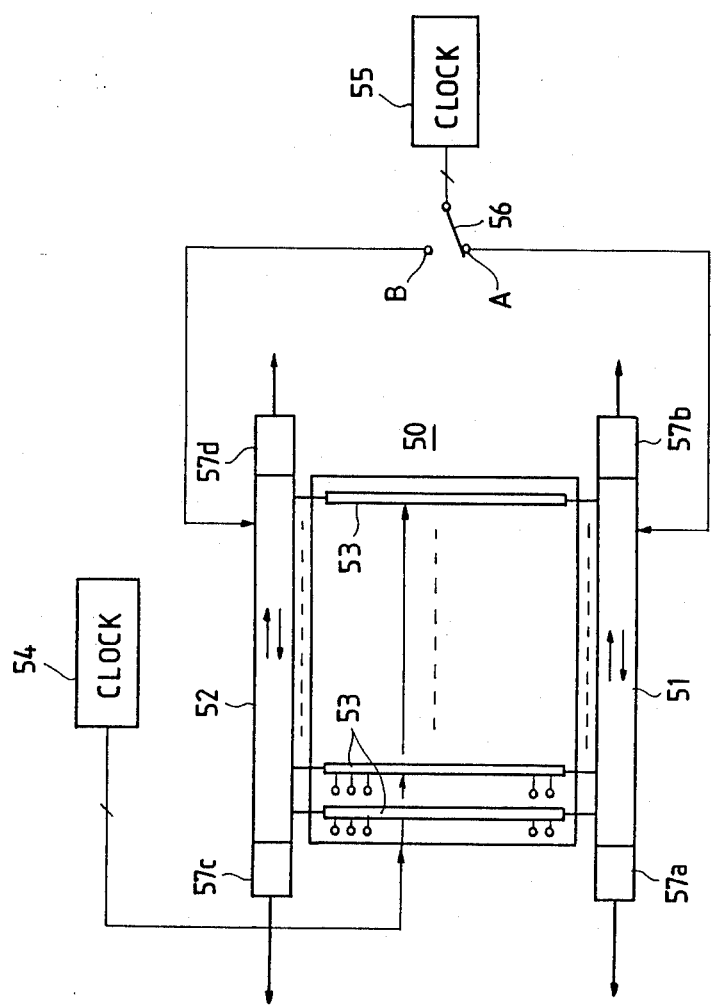
FIGS. 6 to 8 are illustrations of further modifications of the invention.

In FIG. 6, an image sensor 50 of the interline transfer mode is provided with a pair of horizontal scan CCDs 51 and 52 located one on each horizontal side of the image sensor 50. Vertical scan CCDs 53 of image sensor 50 are driven by triple-phase sequentially clocked pulses to transfer charge packets supplied from a reversible triple-phase clock source 54. Depending on the phase relation of the clock pulses, charge packets are transferred downward to horizontal scan CCD 51 or upward to horizontal scan CCD 52. These horizontal scan CCDs are selectively coupled by a switch 56 to a reversible triple-phase clock source 55. If CCD 51 is to be operated, switch 56 is switched to the A position and if CCD 52 is to be operated instead, switch 56 is switched to the B position. The direction of charge transfer is determined by the clock 55. Readout circuits 57 are connected to opposite ends of each horizontal scan CCD.

If the incident image is in reverse orientation to the original with respect to the vertical, switch 51 is in the A position and CCD 51 is driven in the rightward direction, and if it is reversely oriented with respect to the horizontal, switch 56 is in the B position and CCD 52 is driven in the leftward direction. If the incident image is in reverse to the original with respect to the both horizontal and vertical, switch 56 is in the B position and CCD 52 is driven in the rightward direction.

Figure 7:
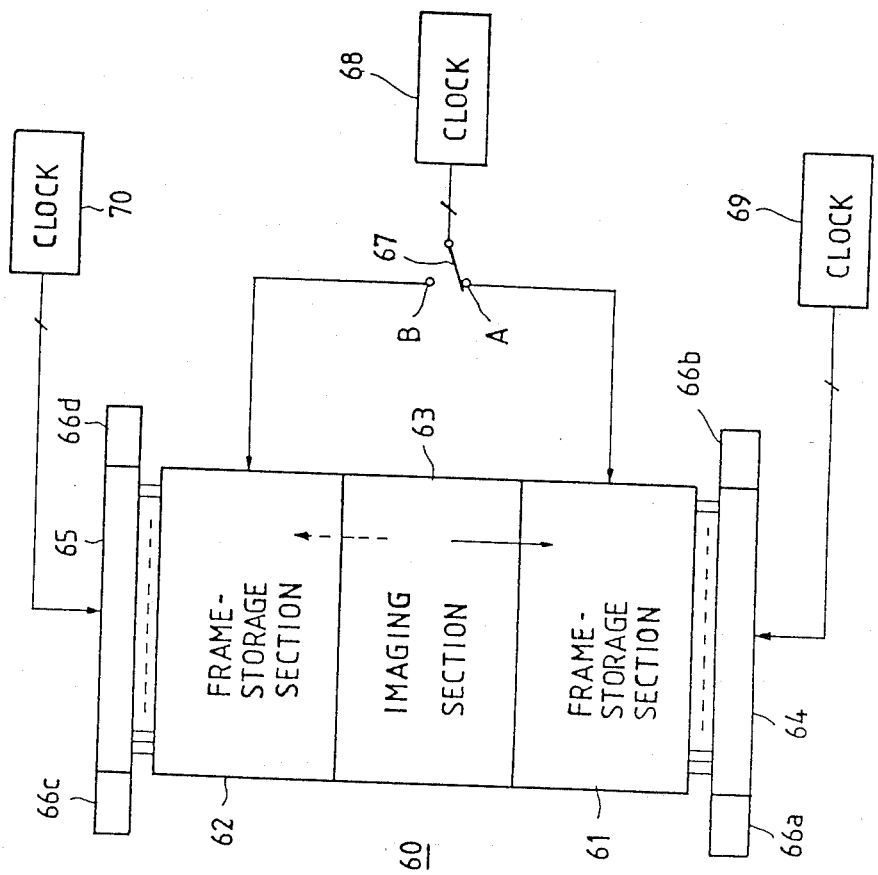

In FIG. 7, an image sensor 60 is fabricated in the frame-storage mode having two frame-storage sections 61 and 62 on opposite sides of imaging section 63. Frame-storage sections 61 and 62 are respectively connected to horizontal scan CCDs 64 and 65 each having a pair of readout circuits 66. Frame-storage sections 61 and 62 are coupled to the A and B positions of switch 67 which is connected to a dual-phase clock source 68. Horizontal-scan CCDs 64 and 65 are connected to reversible triple-phase clock sources 69 and 70, respectively.

Depending on the relationship between the incident image and the original, switch 67 is operated to drive one of the frame-storage sections and the phase relation of the one of the reversible clock sources that is associated with the selected frame-storage section is determined.

Figure 8:
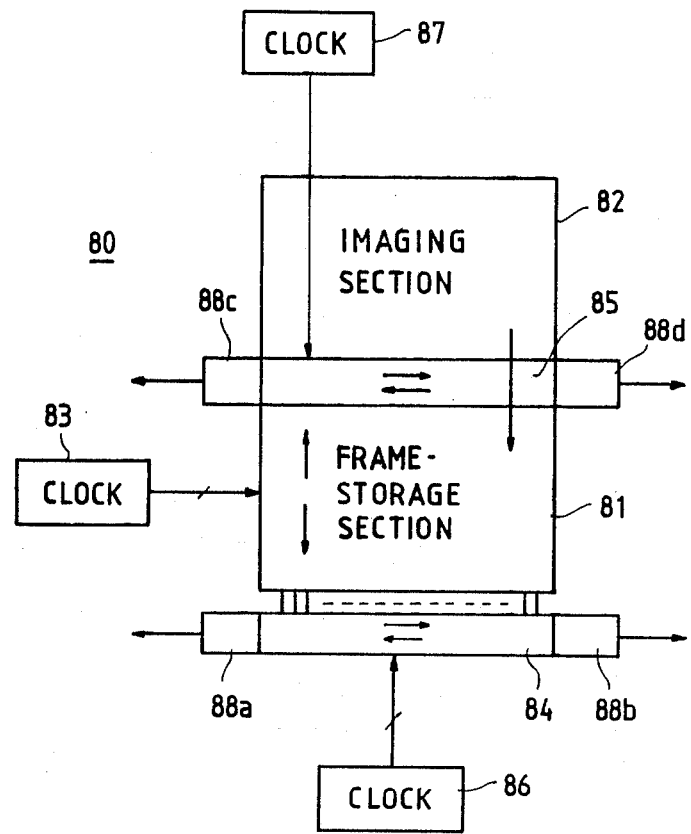

FIG. 8 is a modification of the FIG. 7 embodiment in which image sensor 80 is provided with a single frame-storage section 81. A reversible triple-phase clock source 83 drives frame-storage section 81 in downward or upward direction depending on whether the image incident on imaging section 82 is horizontally reversed with respect to the original or not. Horizontal scan CCDs 84 and 85 are provided one on each horizontal side of frame-storage section 81. CCDs 84 and 85 are driven in either horizontal direction by triple-phase sequentially clocked voltage pulses supplied from reversible triple-phase clock sources 86 and 87, respectively. Readout circuits 88 are connected to opposite ends of each horizontal scan CCD.

Figure 9:
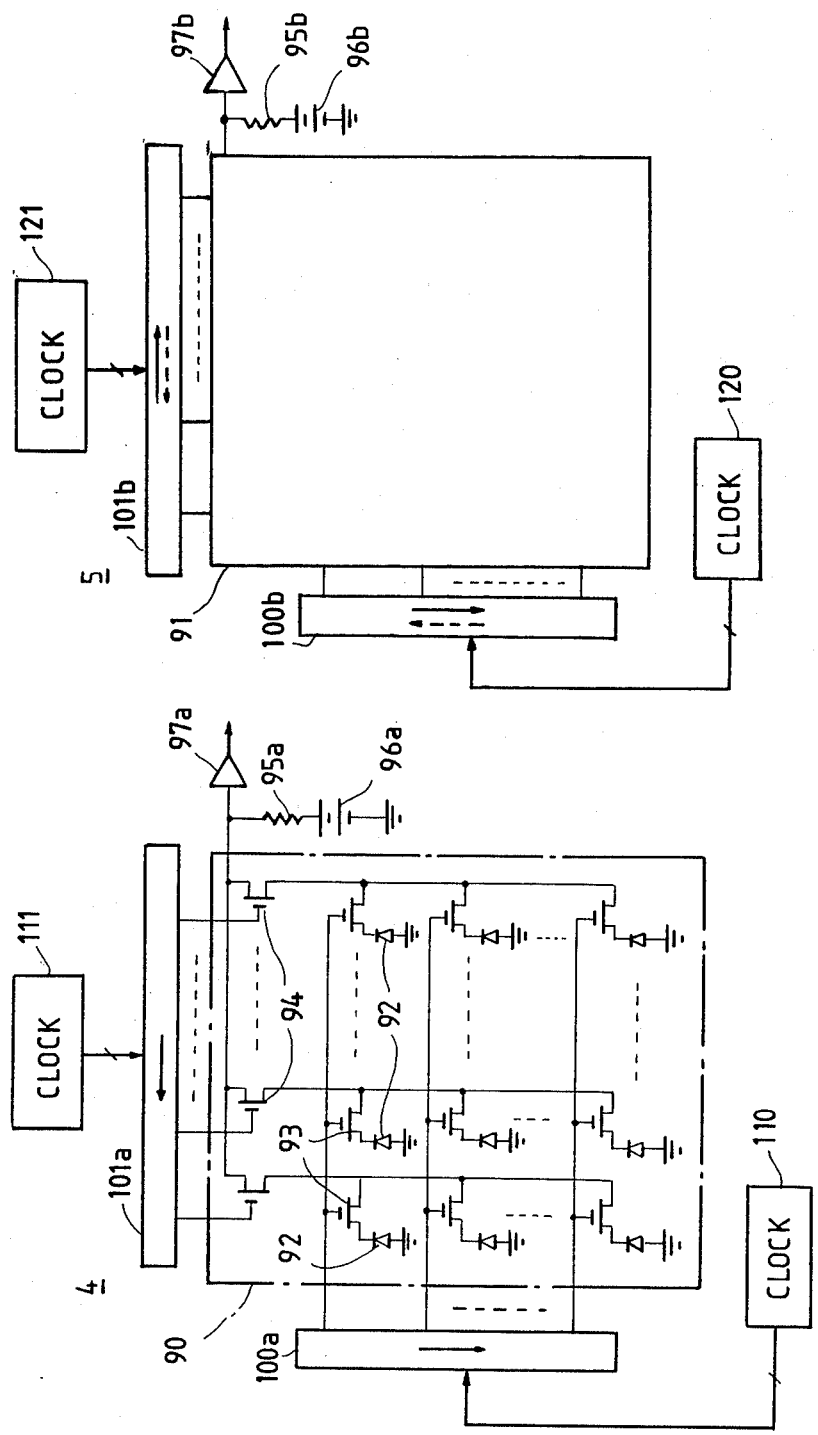
FIG. 9 is an illustration of area imagers of charge injection mode.

Imagers 4 and 5 of FIG. 1 can also be implemented by charge injection area imagers 90 and 91 shown in FIG. 9. Each charge injection area imager is an XY addressed matrix of photodiodes 92 which constitute picture elements, or pixels, and MOS (metal-oxide semiconductor) field effect transistors 93 whose source electrodes are coupled to the associated photodiodes. The control gates of MOS FETs 93 arranged on each row are connected together to an associated transfer stage of vertical scan register 100. The drain electrodes of the MOS FETs arranged on each column are coupled to the source electrode of an associated one of horizontal scan MOS field effect transistors 94, the drain electrodes of which are coupled together to a common readout circuit formed by a load resistor 95, a DC voltage source 96 and an amplifier 97. The control gates of MOS FETs 94 are connected respectively to associated transfer stages of a horizontal scan register 101.

Vertical and horizontal scan registers 100a and 101a of imager 4 are pulsed by dual-phase clock sources 110 and 111 so that image sensor 90 is scanned in the downward and leftward directions. On the other hand, vertical and horizontal scan registers 100b and 101b of imager 5 are pulsed by reversible triple-phase clock sources 120 and 121, respectively. In the arrangement of FIG. 1, the horizontal scan register 101b is driven in the rightward direction and vertical scan register 100b is driven in downward direction. The directions of vertical and horizontal scans can be altered by reversing the phase relation of one or both of clock sources 120 and 121 depending on the relationship between the image incident on imager 5 and the original as indicated by broken-line arrows.

What is claimed is:

1. A solid state color image pickup apparatus comprising:
    a single semi-transparent mirror for splitting an incident optical image into first and second optical images of like wavelength components and directing said first and second images onto first and second intersecting planes, respectively, so that said first and second images are in mirror-image relationship to each other on said planes with respect to a line of intersection between said first and second planes;
    a first solid-state area imager located on said first plane; and
    a second solid-state area imager identical to said first solid-state area imager, the second solid-state area imager being located on said second plane;
    wherein each of said first and second solid-state area imagers comprises an image sensor for generating charges, a first bidirectional charge transfer means connected to said image sensor and a second bidirectional charge transfer means connected to said first bidirectional charge transfer means, charge transfer directions of said first and second charge transfer means being perpendicular to each other;
    said solid-state color image pickup apparatus further comprising:
    means for driving the first and second bidirectional charge transfer means of each said first and second solid-state area imagers so that signals derived from said first and second solid-state area imagers will produce identical electronic images;
    luminance signal processing circuit means responsive to an output signal from said first solid-state area imager for generating a luminance signal;
    chrominance signal processing circuit means responsive to an output signal from said second solid-state area imager for producing a chrominance signal; and
    encoding means for generating a composite color television signal from said luminance and chrominance signals;
    said first and second solid-state area imagers being interline-transfer solid-state area imagers;
    said image sensor comprising a plurality of linear arrays of light-sensitive elements for generating charges in response to an incident optical image;
    said first bidirectional charge transfer means comprising a plurality of vertically-extending bidirectional charge transfer means connected to said plurality of linear arrays;
    said second bidirectional charge transfer means comprising a first horizontally-extending bidirectional charge transfer means connected to one end of each of said plurality of vertically-extending bidirectional charge transfer means;
    each of said first and second interline-transfer solid-state area imagers further comprising a first readout means connected to one end of said first horizontally-extending bidirectional charge transfer means;
    each of said first and second interline-transfer solid-state area imagers further comprising a second readout means connected to the other end of said first horizontally-extending bidirectional charge transfer means; and
    said driving means comprising means for driving the first horizontally-extending bidirectional charge transfer means of each of said first and second interline-transfer solid-state area imagers in a selected one of two opposite directions;
    wherein said second bidirectional charge transfer means further comprises a second horizontally-extending bidirectional charge transfer means connected to the opposite end of each of said plurality of vertically-extending bidirectional charge transfer means;
    each of said first and second interline-transfer solid-state area imagers further comprises a third and a fourth readout means connected to opposite ends of said second horizontally-extending bidirectional charge transfer means; and
    said driving means further comprises means for driving said second horizontally-extending bidirectional charge transfer means in a selected one of two opposite directions and means for driving said plurality of vertically-extending charge transfer means in a selected one of two opposite directions.

2. A solid-state color image pickup apparatus comprising:
    a single semi-transparent mirror for splitting an incident optical image into first and second optical images of like wavelength components and directing said first and second images onto first and second intersecting planes, respectively, so that said first and second images are in mirror-image relationship to each other on said planes with respect to a line of intersection between said first and second planes;

a first solid-state area imager located on said first plane; and a second solid-state area imager identical to said first solid-state area imager, the second solid-state area imager being located on said second plane;

wherein each of said first and second solid-state area imagers comprises an image sensor for generating charges, a first bidirectional charge transfer means connected to said image sensor and a second bidirectional charge transfer means connected to said first bidirectional charge transfer means, charge transfer directions of said first and second charge transfer means being perpendicular to each other;

said solid-state color image pickup apparatus further comprising:

means for driving the first and second bidirectional charge transfer means of each of said first and second solid-state area imagers so that signals derived from said first and second solid-state area imagers will produce identical electronic images;

luminance signal processing circuit means responsive to an output signal from said first solid-state area imager for generating a luminance signal;

chrominance signal processing circuit means responsive to an output signal from said second solid-state area imager for producing a chrominance signal; and encoding means for generating a composite color television signal from said luminance and chrominance signals;

said first and second solid-state area imagers being frame-transfer solid-state area imagers;

said image sensor comprising a frame-imaging section for generating charges in response to an incident optical image;

said first bidirectional charge transfer means comprising a first frame-storage section connected to one side of said frame-imaging section;

said second bidirectional charge transfer means comprising a first horizontally-extending bidirectional charge transfer means connected to one side of said first frame-storage section;

each of said first and second frame-transfer solid-state area imagers further comprising a first readout means connected to one end of said first horizontally-extending bidirectional charge transfer means;

each of said first and second frame-transfer solid-state area imagers further comprising a second readout means connected to the other end of said first horizontally-extending bidirectional charge transfer means; and said driving means comprising means for driving the first horizontally-extending bidirectional charge transfer means of each of said first and second frame-transfer solid-state area imagers in a selected one of two opposite directions;

wherein said first bidirectional charge transfer means further comprises a second frame-storage section connected to a side of said frame-imaging section which is opposite the side to which said first frame-storage section is connected;

said second bidirectional charge transfer means further comprises a second horizontally-extending bidirectional charge transfer means connected to said second frame-storage section;

each of said first and second frame-transfer solid-state area imagers further comprises a third and a fourth readout means connected to opposite ends of said second horizontally-extending bidirectional charge transfer means; and said driving means further comprises means for driving a selected one of said first and second horizontally-extending bidirectional charge transfer means in a selected one of two opposite directions and means for driving a selected one of said first and second frame-storage sections in the vertical direction toward the associated one of said first and second horizontally-extending bidirectional charge transfer means.

3. A solid-state color image pickup apparatus comprising:

a single semi-transparent mirror for splitting an incident optical image into first and second optical images of like wavelength components and directing said first and second images onto first and second intersecting planes, respectively, so that said first and second images are in mirror-image relationship to each other on said planes with respect to a line of intersection between said first and second planes;

a first solid-state area imager located on said first plane; and a second solid-state area imager identical to said first solid-state area imager, the second solid-state area imager being located on said second plane;

wherein each of said first and second solid-state area imagers comprises an image sensor for generating charges, a first bidirectional charge transfer means connected to said image sensor and a second bidirectional charge transfer means connected to said first bidirectional charge transfer means, charge transfer directions of said first and second charge transfer means being perpendicular to each other;

said solid-state color image pickup apparatus further comprising:

means for driving the first and second bidirectional charge transfer means of each of said first and second solid-state area imagers so that signals derived from said first and second solid-state area imagers will produce identical electronic images;

luminance signal processing circuit means responsive to an output signal from said first solid-state area imager for generating a luminance signal;

chrominance signal processing circuit means responsive to an output signal from said second solid-state area imager for producing a chrominance signal; and encoding means for generating a composite color television signal from said luminance and chrominance signals;

said first and second solid-state area imagers being frame-transfer solid-state area imagers;

said image sensor comprising a frame-imaging section for generating charges in response to an incident optical image;

said first bidirectional charge transfer means comprising a frame-storage section connected to one side of said frame-imaging section;

said second bidirectional charge transfer means comprising a first horizontally-extending bidirectional charge transfer means connected to one side of said frame-storage section;

each of said first and second frame-transfer solid-state area imagers further comprising a first readout means connected to one end of said first horizontally-extending bidirectional charge transfer means;

each of said first and second frame-transfer solid-state area imagers further comprising a second readout means connected to the other end of said first horizontally-extending bidirectional charge transfer means; and said driving means comprising means for driving the first horizontally-extending bidirectional charge transfer means of each of said first and second frame-transfer solid-state area imagers in a selected one of two opposite directions;

wherein said first bidirectional charge transfer means further comprises a second horizontally-extending bidirectional charge transfer means connected between said frame-imaging section and said frame-storage section, said first and second horizontally-extending bidirectional charge transfer means being connected to opposite sides of said frame-storage section;

each of said first and second frame-transfer solid-state area imagers further comprises a third and a fourth readout means connected to opposite ends of said second horizontally-extending bidirectional charge transfer means; and said driving means further comprises means for driving a selected one of said first and second horizontally-extending bidirectional charge transfer means in a selected one of two opposite directions and means for driving said frame-storage section in a selected one of two opposite directions.

* * * * *